United States Patent
Ninio et al.

(10) Patent No.: US 7,866,723 B2
(45) Date of Patent: Jan. 11, 2011

(54) VEHICULAR SEAT FOR HANDICAPPED AND ELDERLY PASSENGERS

(76) Inventors: V. Guy Ninio, 22954 Collins St., Woodland Hills, CA (US) 91367; Ken Boyar, 110 Kennedy #5, San Antonio, TX (US) 78209

( * ) Notice: Subject to any disclaimer, the term of this patent is extended or adjusted under 35 U.S.C. 154(b) by 84 days.

(21) Appl. No.: 11/871,415

(22) Filed: Oct. 12, 2007

(65) Prior Publication Data
US 2008/0111364 A1 May 15, 2008

Related U.S. Application Data

(60) Provisional application No. 60/829,354, filed on Oct. 13, 2006.

(51) Int. Cl.
*B60N 2/02* (2006.01)
(52) U.S. Cl. ............. 296/65.11; 297/423.2; 297/344.11
(58) Field of Classification Search ............. 296/65.11, 296/65.12, 65.01, 67, 68; 297/423.2, 344.11; 29/401.1
See application file for complete search history.

(56) References Cited

U.S. PATENT DOCUMENTS

| | | | |
|---|---|---|---|
| 1,961,205 A * | 6/1934 | Johanet .................... 296/181.1 |
| 2,290,464 A | 7/1942 | Buchheit |
| 2,587,679 A | 3/1952 | Atkinson |
| 2,753,947 A * | 7/1956 | Mach ....................... 180/89.18 |
| 2,822,858 A | 2/1958 | Mussler |
| 4,479,752 A * | 10/1984 | Todd .......................... 414/462 |
| 4,600,239 A | 7/1986 | Gerstein et al. |
| 5,056,849 A | 10/1991 | Norris, Jr. et al. |
| 6,024,398 A | 2/2000 | Horton et al. |
| 6,113,175 A * | 9/2000 | Guim et al. .............. 296/65.18 |
| 6,199,945 B1 * | 3/2001 | Kim ............................ 297/94 |
| 6,557,919 B2 | 5/2003 | Suga et al. |
| 6,609,753 B2 | 8/2003 | Schmidt-Schaeffer |
| 6,962,383 B2 | 11/2005 | Takenoshita et al. |

OTHER PUBLICATIONS

International Searching Authority, The International Search Report and The written Opinion of the International Searching Authority, or the Declaration, PCT/US07/81203, Aug. 4, 2008, 10 pgs.

* cited by examiner

*Primary Examiner*—Glenn Dayoan
*Assistant Examiner*—Melissa A Black
(74) *Attorney, Agent, or Firm*—Wood, Herron & Evans, LLP

(57) ABSTRACT

A seat for a vehicle having an interior portion and a rear portion comprising a first position substantially within a vehicle and a second position substantially outside the vehicle. A transfer coupling element is operatively coupled to a structure in the interior portion of the vehicle, wherein said seat has a substantially constant orientation during a motion between first and second positions.

6 Claims, 3 Drawing Sheets

VEHICULAR SEAT FOR HANDICAPPED AND ELDERLY PASSENGERS

This claims the benefit of U.S. Provisional Patent Application Ser. No. 60/829,354, filed Oct. 13, 2006 and hereby incorporated by reference in its entirety.

BACKGROUND OF THE INVENTION

This invention is directed to a seat for a vehicle, such as an automobile or limousine, which allows for easy and safe ingress and egress of an elderly or handicapped person.

Conventional vehicular seats, such as those in conventional passenger automobiles, often are not suitably equipped to accommodate ingress and egress of elderly or handicapped persons, for whom there may be considerable difficulty in doing so. Vehicular seats are known that seek to address the needs of elderly and handicapped persons. Such seats include swivel seats that may consist, for example, of a simple vehicular seat that pivots about a vertical axis. Swivel seats may require a relatively large floor space within a vehicle, to allow for rotational and/or translational maneuvering of the seat as it transports a person in or out of the vehicle. As a result, the interior of vehicles carrying swivel seats and the like may be unsightly and appear to be specially made for handicapped persons. Maneuvering of a swivel seat between a deployed position facing the outside of the vehicle and a resting position (secure and ready for motion of the vehicle), may further require rotation of a person's body, which is undesirable for some elderly and/or handicapped persons. Swivel seats may also face forwardly away from the vehicle in their deployed position and/or expose less than the full seat, thus potentially requiring a wheelchair-ridden person to step forward before he/she can transfer to a wheelchair.

Other known seats made for handicapped or elderly persons may employ heavy lifting equipment that is costly, difficult to maintain, and limited to specific types of vehicles. Due to their relatively large size and weight, known seats of this type may be suitable for use only on large-sized vans or buses and not on passenger cars or limousines. Even when installed in large vans or buses, known seats of this type may limit the interior space available for other passengers and for interior features and are conspicuous and often unsightly thereby drawing attention to the handicap capability of the vehicle.

Other known handicap accessible vehicles permit a wheelchair or other device to be rolled directly into the vehicle with the passenger in the wheelchair or the like. While such vehicles are functional, they are not usually aesthetically engaging and draw attention to their function and/or passengers.

SUMMARY OF THE INVENTION

These and other problems in the prior art are addressed by this invention, which, in one embodiment, includes a seat for a vehicle having an interior portion and a rear portion. The seat has a first position substantially within the vehicle, a second position substantially outside the vehicle, and a transfer coupling element operatively coupled to a structure in the interior portion of the vehicle, such as a second seat in the interior portion of the vehicle. The seat has a substantially constant orientation during its motion between the first position and the second position and does not require pivoting or swiveling.

In one embodiment, the motion from the first position to the second position is substantially uniaxial and further corresponds to an orientation such that the seat generally faces the rear portion of the vehicle. In one embodiment, the transfer coupling element may comprise a sliding or telescoping structure.

In another embodiment, the vehicle has an interior portion, a rear portion and a door aperture adapted for ingress and egress of passengers respectively into and out of the vehicle. A door is hingedly coupled proximate the aperture and adapted to fit over the aperture. The door has a first position to permit the ingress and egress of passengers and a second position substantially covering the aperture. Further, the door forms an angle with respect to a plane defined by the aperture when the door is in the first condition, such that the door does not substantially hinder passage of the seat into and out of the vehicle. A transfer coupling element operatively couples the seat to a structure in the interior portion of the vehicle and further permits movement of the seat from a first position substantially within the vehicle to a second position substantially outside the vehicle such that the seat remains in a substantially constant orientation during motion between the first position and the second position. With the seat positioned outside of the vehicle, a passenger can easily access the seat and transfer to it from a wheelchair, walker or other position. Once seated in the seat, the passenger and seat are moved back into the vehicle for transport.

In another embodiment, a method for operatively moving a seat from a first position substantially within a vehicle to a second position substantially outside the vehicle includes opening a door adapted to fit over an aperture adjacent a seat, sliding the seat from the first position to the second position, and maintaining the seat in a constant orientation between the first position and the second position. The door may be such that it does not substantially hinder passage of the seat into and out of the vehicle.

Advantageously, the vehicle equipped with a seat mounted on a transfer coupling element according to this invention provides for easy, convenient and safe ingress to and egress from the vehicle for all individuals and passengers. Moreover, the vehicle so equipped has a standard and aesthetically appealing appearance thereby avoiding any unwarranted attention to a handicap accessible vehicle and such vehicle can readily be used without for handicap or other passengers as needed with no readily apparent differences from a standard vehicle.

BRIEF DESCRIPTION OF THE DRAWINGS

These and other objectives and advantages will become readily apparent to those of ordinary skill in the art from the following description of a preferred and other embodiments of the invention and from the drawings in which.

DETAILED DESCRIPTION

Figure 1:
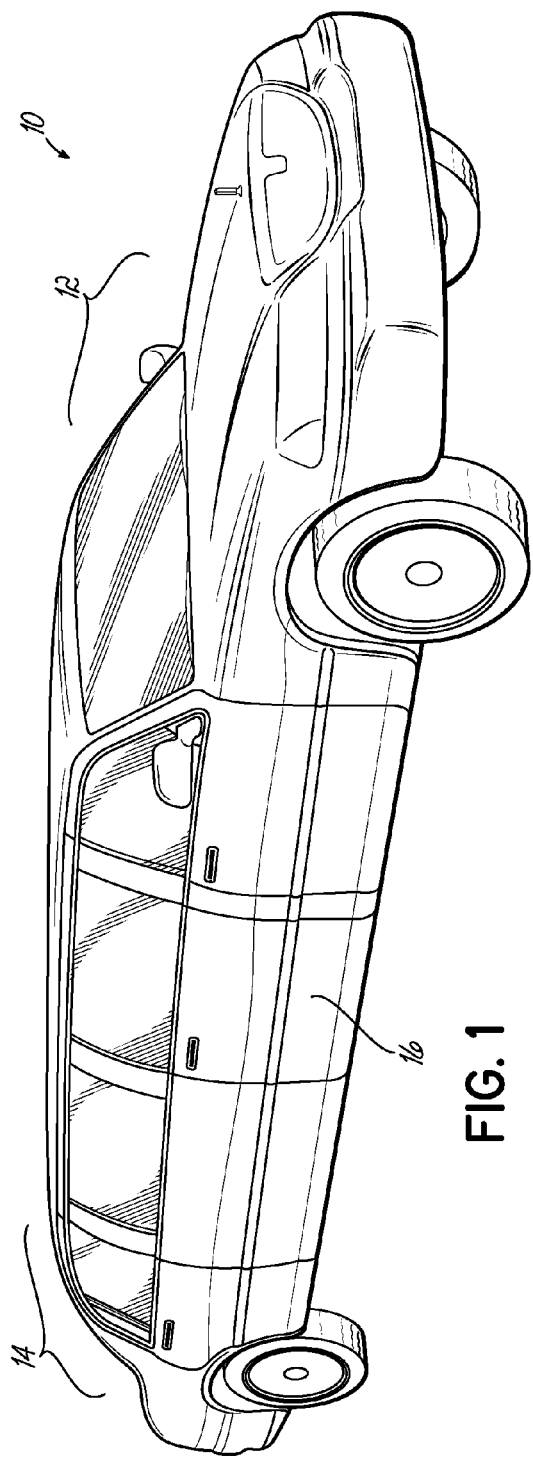
FIG. 1 is a perspective view of a vehicle such as a limousine according to one embodiment of this invention.

With reference to FIG. 1, one embodiment according to this invention includes a vehicle, such as a limousine 10, having a front portion 12 and a rear portion 14. Vehicle 10 includes various doors, such as exemplary door 16, generally located between the front and back portions 12, 14 of vehicle 10, the selection and description of which are done for illustration purposes. Commonly, the door 16 is referred to as a "fifth" door on a limousine 10.

Figure 2A:
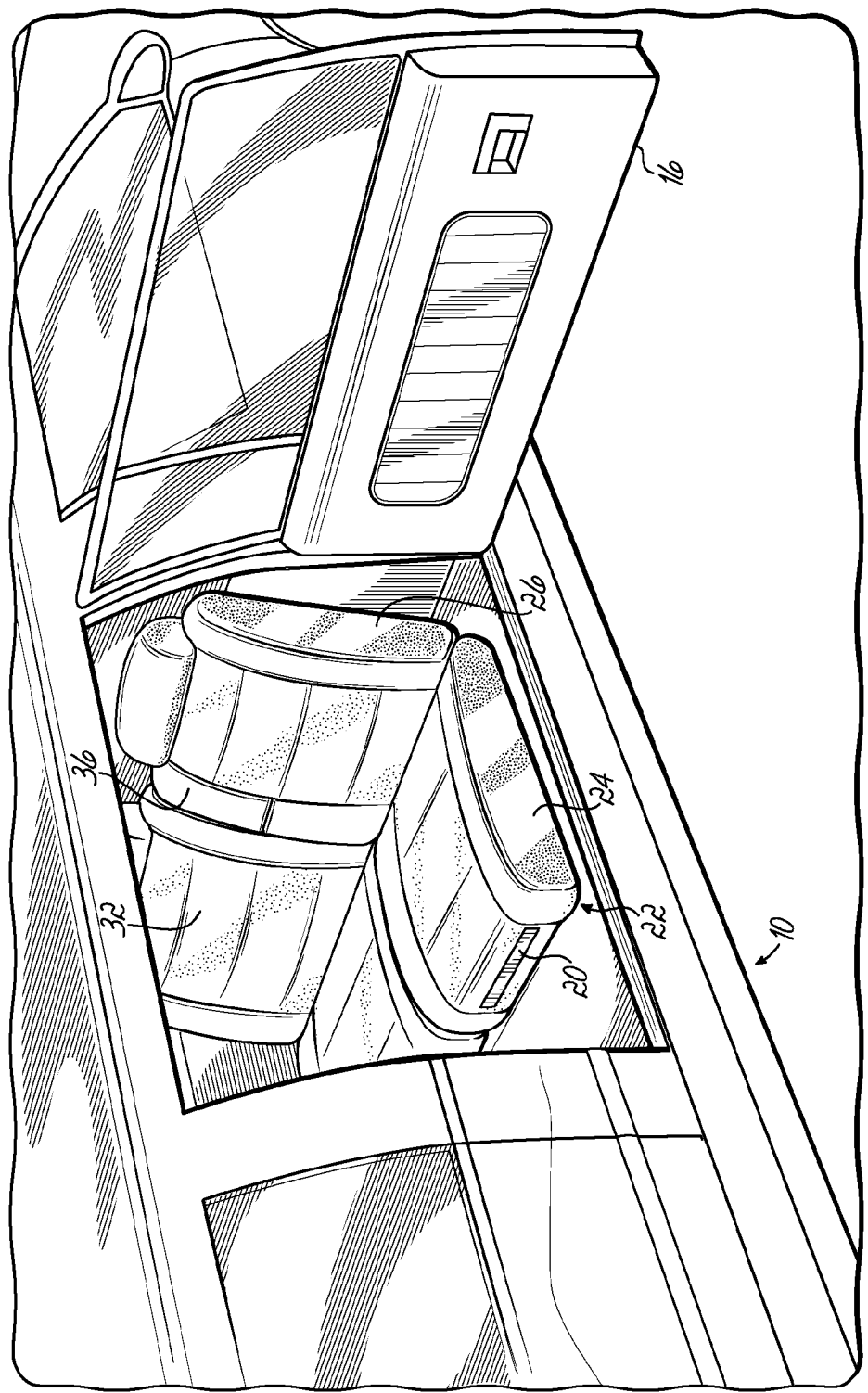
FIG. 2A is a perspective view of a seat in a first, unextended position, and a door, adjacent the seat, in an open condition of the vehicle of FIG. 1.

With reference to FIG. 2A, vehicle 10 has the door 16 hingedly coupled to a frame of the vehicle 10 adjacent a door opening or an aperture 18 used for ingress and egress of passengers into and out of the vehicle 10. In this embodiment, a seat 22 lies within the vehicle 10, generally faces the rear portion 14 of the vehicle 10, and is adjacent a second seat 32 also within the vehicle 10. The seat 22 includes a generally horizontal cushion portion 24 and a generally vertical back support portion 26. In this exemplary embodiment, the door 16, when opened, forms an angle 28 of about 90° or greater, with respect to a plane defined by the aperture 18. FIG. 2A depicts the seat 22 in a first, retracted position substantially within the vehicle 10, such that it lies substantially adjacent the second seat 32, permitting the seats 22, 32 to function and appear as a conventional seats within a conventional vehicle. The first position of the seat 22 may generally correspond to the position of the seat 22 during travel of the vehicle 10.

Figure 2B:
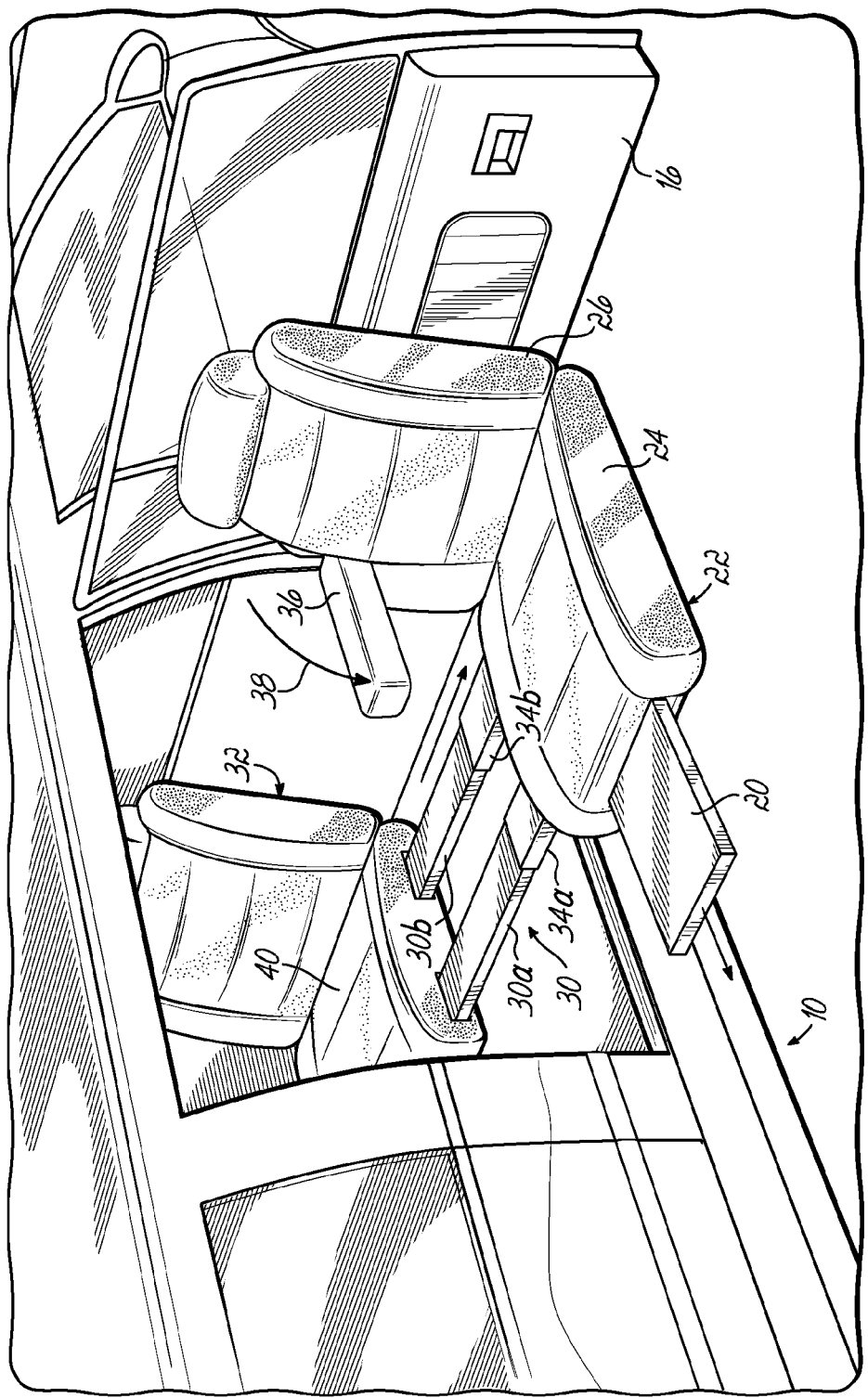
FIG. 2B is a view similar to FIG. 2A with the seat in a second, extended position, further showing a footrest extending from the seat and a transfer coupling element between the seat and a structure within the interior of the vehicle.

With reference to FIG. 2B, the seat 22 is shown in a second, extended position, lying substantially outside the vehicle 10. The door 16 does not substantially hinder passage of the seat 22 into and out of the vehicle 10. In this exemplary embodiment, an armrest 36, attached on one side of the rear back portion 26 of the seat 22, is movable between a deployed position where it lies generally parallel to the cushion portion 24 and an stowed position, where it lies generally parallel to the back support portion of 26. The motion between the deployed and stowed positions of the armrest 36 is depicted by arrow 38. Alternatively, another embodiment may include one or more armrests of a shape or location different from those depicted in FIG. 2B or include no armrest at all.

With continued reference to FIG. 2B, a footrest 20 extends outwardly from the cushion portion 24 of the seat 22, generally in the direction of arrow 34, toward the rear portion 14 of the vehicle 10. A transfer coupling assembly 30 connects the seat 22 to the second seat 32 in the interior of the vehicle 10 and lying in generally the same orientation as the seat 22. The transfer coupling assembly 30 in this exemplary embodiment includes two telescoping structures with respective inner telescoping elements 30a, 30b and outer telescoping elements 34a, 34b operatively connecting the seat 22 to the second seat 32. The inner telescoping elements 30a, 30b may lie partially within the cushion portion 40 of the second seat 32 while the outer telescoping elements 34a, 34b may lie partially inside the cushion portion 24 of the seat 22.

The seat 22 may further be slidable with respect to the outer telescoping elements 34a, 34b, such that the seat 22 can be extended further outside of the vehicle 10. Similarly, the inner telescoping elements 30a, 30b may be slidable within the cushion portion 40 of the second seat 32. The outer telescoping elements 34a, 34b are slidably mounted over respective inner telescoping elements 30a, 30b. The sliding motion of the seat 22 between the first, retracted position and the second, extended position may therefore include any combination of respective sliding motions of inner telescoping elements 30a, 30b with respect to the cushion portion 40 of the second seat 32, the outer telescoping elements 34a, 34b with respect to the inner telescoping elements 30A, 30B and the inner telescoping elements 30a, 30b with respect to the cushion portion 24 of the seat 22.

While the embodiment described herein shows a telescoping structure defining the sliding coupling assembly 30 and the sliding motion of the seat 22 in and out of the vehicle 10, persons of ordinary skill in the art will appreciate the fact that any suitable methods to provide a sliding motion of the seat 22 with respect to the second seat 32 or with respect to any other structure within the vehicle 10 may alternatively be substituted. Alternative embodiments may also include transfer coupling assemblies with cross-sectional profiles different from the generally rectangular profile of the assembly 30 or comprise structures other than the telescoping structure depicted herein. An alternative transfer coupling assembly may further be attached or operatively coupled to a portion of the seat 22 other than the cushion portion 24 of the exemplary embodiment depicted in FIGS. 2A-2B.

With continued reference to FIGS. 2A and 2B, the seat 22 is shown in a first position generally facing the rear portion 14 of the vehicle 10 and sliding along one axis, defined by the relative motion of inner and outer telescoping elements 30a, 30b, 34a and 34b of the transfer coupling assembly 30, to a second position substantially outside the vehicle 10 and facing in the same general direction, namely, the rear portion 14 of the vehicle 10.

Figure 3:
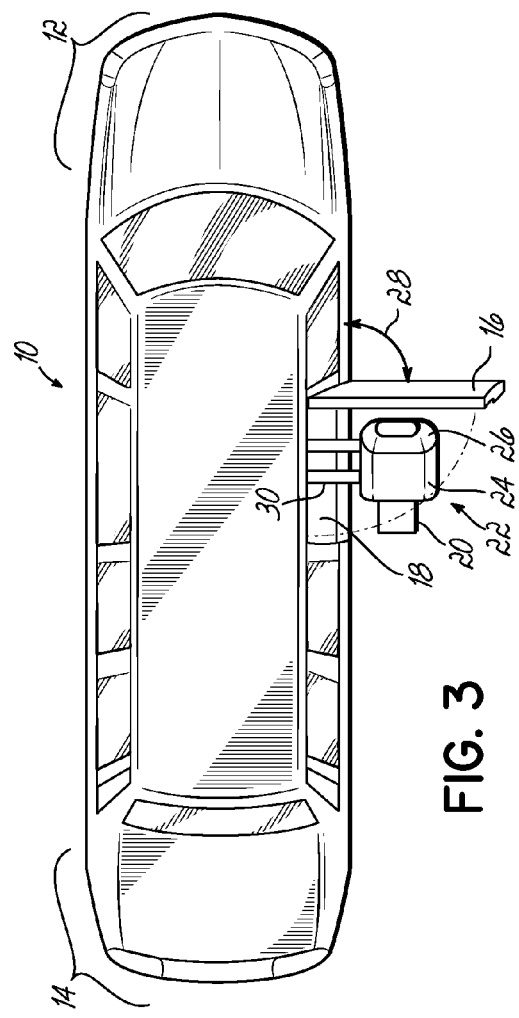
FIG. 3 is a top view of the embodiment of FIG. 2B.

With reference to FIG. 3, the seat 22 is shown in its second, extended position, substantially outside the vehicle 10 and with the footrest 20 in an extended position to facilitate loading and unloading of a passenger onto or away from the seat 22. In this exemplary embodiment, the door 16 is shown forming an angle 28 of about 90° with respect to a plane defined by aperture 18 of the vehicle 10 that permits ingress and egress of passengers respectively into and out of the vehicle 10. While the door 16 is depicted forming an angle of about 90° with the plane defined by the aperture 18, persons of ordinary skill in the art will appreciate that the door 16 may alternatively open such that it forms an angle different from 90°, such as an angle greater than about 90°, so long as such angle allows sliding motion of the seat 22 between the first and second positions without substantially hindering passage of the seat 22.

The motion of the seat 22 from the first position to the second position is such that the seat 22 remains in the same orientation throughout such uniaxial motion. A passenger sitting on the seat 22 may exit the vehicle 10 by sliding the seat 22 from its first, retracted position to its second, extended position and, if desired, by extending the footrest 20 in the direction of arrow 34 to facilitate unloading of the passenger.

Upon completion of the unloading process, the footrest 20 may be slid back into the cushion portion 24 of the seat 22 and the seat 22 may be returned to its first, retracted position by sliding the seat 22 along telescoping elements 30a, 30b and 34a, 34b, such that the seat 22 returns to its first position, best depicted in FIG. 2A. Loading of a passenger would substantially involve the same steps as those described above for unloading of a passenger.

While the embodiment of FIGS. 2A, 2B and 3 depict an exemplary seat 22 located in a relative middle portion of the vehicle 10 and facing the rear portion 14 of the vehicle 10, persons skilled in the art will appreciate that alternative embodiments may include, for example, seats with similar functionality as that of the seat 22 but facing, instead, the front portion 12 of the vehicle 10 and/or located in any portion of the vehicle 10, such as the front portion 12, the rear portion 14 or any portion there between.

Accordingly, further embodiments, applications and modifications of the invention will become readily apparent to those of ordinary skill in the art without departing from the scope of the invention and the invention is to be bound only by the claims appended hereto and equivalents thereof.

What is claimed is:

1. A method for loading and unloading a passenger sitting on a seat of a vehicle having a front end and a rear end, the vehicle having a door adjacent the seat that opens from a closed position in a direction outwardly from the vehicle and in a direction toward the front end, the seat facing the rear end and being slidable on a transfer coupling from a first position within the vehicle and confronting an adjacent seat to a second position substantially outside the vehicle while maintaining the rearwardly-facing orientation of the seat, the transfer coupling including respective telescoping elements received within cushion portions of the seat and the adjacent seat, the method comprising:

opening the door in a direction outwardly from the vehicle and toward the front end of the vehicle;

sliding the seat from the first position to the second position on the transfer coupling while maintaining the rearwardly-facing orientation; and unloading the passenger from the seat with the seat in the rearwardly-facing orientation by moving the passenger in a direction toward the rear of the vehicle.

2. The method of claim 1, further comprising opening the door to thereby form an angle of about 90 degrees or greater between the door and a plane defined by a door aperture adapted for ingress and egress of the passenger into and out of the vehicle.

3. The method of claim 1, wherein sliding the seat from the first position to the second position includes moving the seat from within a limousine to a position outside the limousine.

4. The method of claim 1, wherein the passenger is handicapped, the method further comprising:

assisting the handicapped passenger onto the seat in a passenger orientation facing away from the open door when the seat is in the second position thereof;

maintaining the handicapped passenger's orientation generally constant when moving the seat from the second position to the first position thereof; and transporting the handicapped passenger in the vehicle in the generally constant passenger's orientation.

5. A vehicle for facilitating the ingress or egress of passengers, the vehicle comprising:

a vehicle body defining an interior of the vehicle;

a door hingedly coupled to said vehicle body adjacent a door opening, said door having a closed position covering said door opening and an open position providing access to said vehicle interior through said door opening;

a first seat within said vehicle interior and including at least a horizontal cushion portion for receiving a passenger thereon;

a second seat within said vehicle interior and including at least a horizontal cushion portion for receiving a passenger thereon;

said second seat being slidably movable relative to said first seat from a first position within said vehicle interior and adjacent said first seat, to a second position extending outside said vehicle interior through said door opening; and a transfer coupling connecting said first seat to said second seat and facilitating movement of said second seat from said first position to said second position, said transfer coupling comprising:

first and second inner telescoping elements, and first and second outer telescoping elements slidably received over said inner telescoping elements, said first and second inner telescoping elements received within said cushion portion of said first seat, said first and second outer telescoping elements received within said cushion portion of said second seat, such that said inner and outer telescoping elements are concealed from view when said second seat is in said first position adjacent said first seat with said respective cushion portions defining a substantially continuous seating surface.

6. The vehicle of claim 5, wherein said door opens from said closed position in a direction outwardly from said vehicle body and in a direction toward a front end of the vehicle, and wherein said first and second seats face a rear end of the vehicle, the vehicle further comprising:

a footrest having a first position received within said cushion of said second seat and a second position extending outwardly from said cushion in a direction toward the rear end of the vehicle while said second seat is moved from said first position to said second position.

* * * * *